United States Patent
Herzog et al.

(10) Patent No.: US 9,536,202 B2
(45) Date of Patent: Jan. 3, 2017

(54) IDENTIFYING GEOSPATIAL PATTERNS FROM DEVICE DATA

(71) Applicant: Microsoft Technology Licensing, LLC, Redmond, WA (US)

(72) Inventors: Shai Herzog, Bellevue, WA (US); Jyh-Han Lin, Mercer Island, WA (US); Miller Thomas Abel, Mercer Island, WA (US); Moe Khosravy, Bellevue, WA (US); Katrika Morris, Kirkland, WA (US); Karon A. Weber, Kirkland, WA (US); James Kai Yu Lau, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 617 days.

(21) Appl. No.: 13/958,957

(22) Filed: Aug. 5, 2013

(65) Prior Publication Data
US 2014/0040179 A1    Feb. 6, 2014

Related U.S. Application Data

(63) Continuation of application No. 12/629,679, filed on Dec. 2, 2009, now Pat. No. 8,504,512.

(51) Int. Cl.
*G06N 5/00*    (2006.01)
*G06F 1/00*    (2006.01)
(Continued)

(52) U.S. Cl.
CPC .............. *G06N 5/048* (2013.01); *G06Q 10/10* (2013.01); *G09B 29/007* (2013.01)

(58) Field of Classification Search
CPC ............ G06N 5/02; G06N 5/04; G06Q 10/10; G06Q 10/04
See application file for complete search history.

(56) References Cited

U.S. PATENT DOCUMENTS 7,136,915 B2   11/2006   Rieger, III
7,450,003 B2   11/2008   Weber et al.
(Continued)

FOREIGN PATENT DOCUMENTS

CN    1576790 A    2/2005
CN    1909022 A    2/2007
(Continued)

OTHER PUBLICATIONS

"Fourth Office Action Issued in Chinese Patent Application No. 201010588493.7", Mailed Date: Aug. 17, 2015, 6 Pages.
(Continued)

*Primary Examiner* — Stanley K Hill
*Assistant Examiner* — Kalpana Bharadwaj
(74) *Attorney, Agent, or Firm* — Judy Yee; Micky Minhas

(57) ABSTRACT

Determining geospatial patterns from device data collected from a plurality of computing devices. The devices represent, for example, a plurality of sources providing the device data. The device data describes the computing devices and/or environments thereof. Some embodiments present the determined patterns to users for editing, update maps with the edited patterns, and distribute the maps to the users. The maps are stored to create a searchable map library.

20 Claims, 4 Drawing Sheets

(51) Int. Cl.
*G06N 5/04* (2006.01)
*G06Q 10/10* (2012.01)
*G09B 29/00* (2006.01)

(56) References Cited

U.S. PATENT DOCUMENTS

| | | | |
|---|---|---|---|
| 7,564,377 B2 | 7/2009 | Kimchi et al. | |
| 2007/0115101 A1* | 5/2007 | Creekbaum | B60R 25/00 340/426.22 |
| 2007/0203644 A1 | 8/2007 | Thota et al. | |
| 2007/0218900 A1 | 9/2007 | Abhyanker | |
| 2008/0294678 A1 | 11/2008 | Gorman et al. | |
| 2008/0307498 A1* | 12/2008 | Johnson | G06F 21/6218 726/3 |
| 2009/0064011 A1 | 3/2009 | Abhyanker | |
| 2009/0112467 A1 | 4/2009 | Jiang et al. | |
| 2009/0157419 A1* | 6/2009 | Bursey | G06Q 10/101 705/346 |
| 2009/0182498 A1 | 7/2009 | Seymour | |

FOREIGN PATENT DOCUMENTS

| | | |
|---|---|---|
| CN | 1932446 A | 3/2007 |
| CN | 101017611 A | 8/2007 |
| CN | 101493338 A | 7/2009 |
| EP | 0921509 B1 | 4/2004 |
| JP | 2007120949 A | 5/2007 |
| JP | 2007336486 A | 12/2007 |
| WO | 2009059766 A | 5/2009 |
| WO | 2009/080070 A1 | 7/2009 |

OTHER PUBLICATIONS

"Third Office Action and Search Report Issued in Chinese Patent Application No. 201010588493.7", Mailed Date: Mar. 11, 2015, 10 Pages.

"First Office Action and Search Report Received for Chinese Patent Application No. 201010588493.7", Mailed Date: Jan. 26, 2014, 13 Pages.

"Second Office Action Issued in Chinese Patent Application No. 201010588493.7", Mailed Date: Oct. 8, 2014, 15 Pages.

Clarke Keir, "Your Social Network on Google Maps", Retrieved at <<http://googlemapsmania.blogspot.com/2009/06/your-social-network-on-google-maps.html>> Jun. 9, 2009, pp. 5.

Non-Final Rejection in U.S. App. No. 12/629,679, Dated: Dec. 6, 2012, pp. 12.

Notice of Allowance and Fees Due (PTOL-85) in U.S. Appl. No. 12/629,679, Dated: Apr. 2, 2013, pp. 11.

"Fifth Office Action Issued in Chinese Patent Application No. 201010588493.7", Mailed Date: Jan. 28, 2016, 6 Pages.

* cited by examiner

IDENTIFYING GEOSPATIAL PATTERNS FROM DEVICE DATA

This application is a continuation of commonly-owned, co-pending U.S. patent application Ser. No. 12/629,679, filed Dec. 2, 2009, the entire disclosure of which is hereby incorporated by reference herein for all purposes.

BACKGROUND

Existing electronic maps are created from various data sources such as satellite imagery, road vector data, terrain data, and the like. The maps provide navigational assistance and serve purposes common to many users. With existing systems, users can create custom maps by adding labels or text (e.g., My House, My Work, My School) to the maps. Further, some systems geocode photographs as the photographs are captured. These systems update the maps with the geocoded photographs, but the users have to provide the labels or other context for the maps to have meaning. Such customization by the users, however, is tedious, error prone, and difficult to share with other users having similar interests. Further, the updated maps are static.

SUMMARY

Embodiments of the disclosure enable the identification of geospatial patterns based on device data. The device data describes a first plurality of computing devices or environments thereof. From the device data, at least one geospatial pattern is identified. In some embodiments, map data is defined based on the identified geospatial pattern. The defined map data is transmitted to a second plurality of computing devices (e.g., peers to the first plurality of computing devices). The second plurality of computing devices each determine whether to incorporate the defined map data into at least one map for presentation to users of the second plurality of computing devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
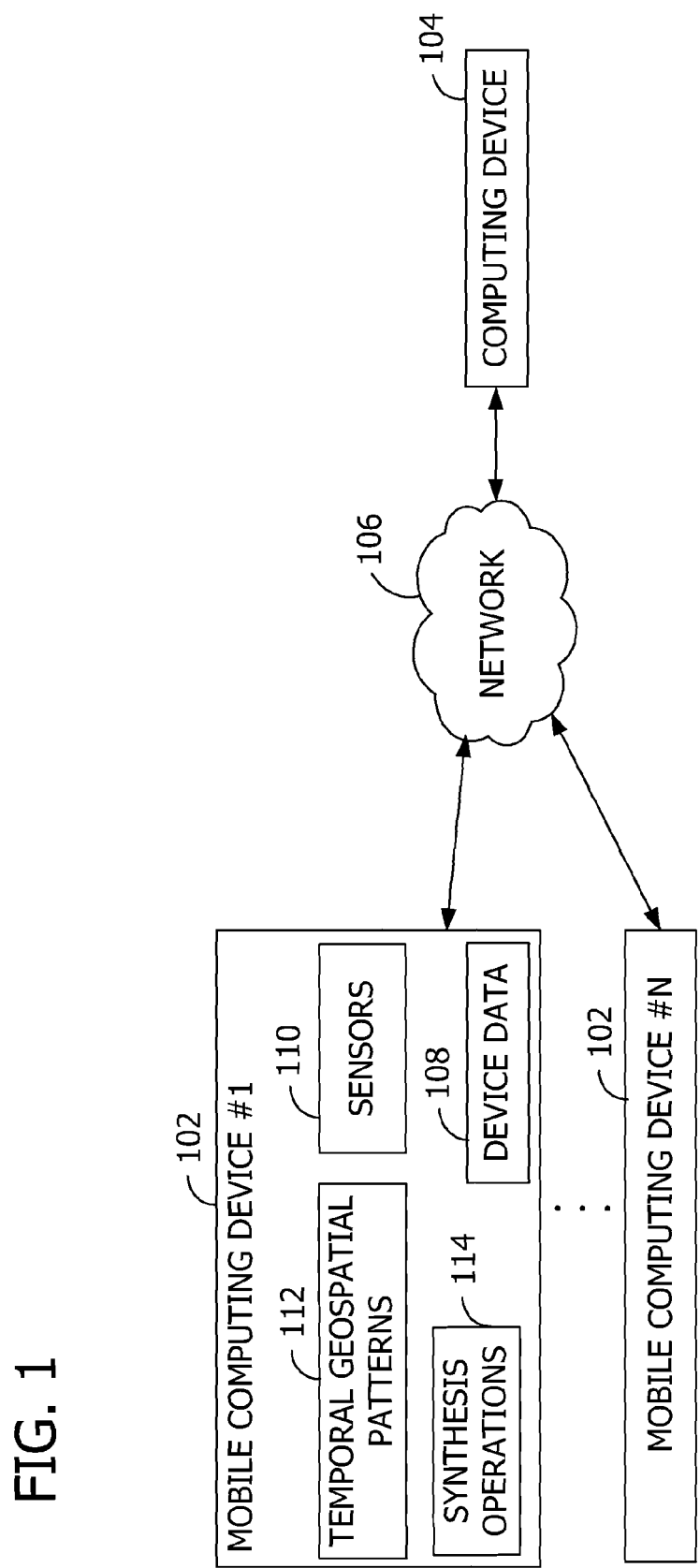
FIG. 1 is an exemplary block diagram illustrating a computing device collecting data from a plurality of mobile computing devices.

Referring to the figures, embodiments of the disclosure enable, at least, the creation of geospatial patterns 206 from device data 108. Some embodiments add the geospatial patterns 206 to one or more maps 208. The geospatial patterns 206 include, for example, one or more of the following: a navigation path, a point of interest, one or more time periods, a weight value, a dwell time at a location (e.g., to indicate popularity of the location), and a social event.

Aspects of the disclosure build socially driven, dynamic, temporal maps 208 in real-time from a set of the patterns 206 (e.g., "grass roots" data), rather than from global sources of information. Embodiments of the disclosure facilitate open, community editing of the maps 208, display of semantic information on the maps 208, and creation of temporal map archives. In some embodiments, the patterns 206 include temporal geospatial patterns and the temporal maps 208 reflect the temporal nature of the patterns 206. In other embodiments, the patterns 206 are more permanent, and the maps 208 thus reflect the persistent nature of the patterns 206.

Referring again to FIG. 1, an exemplary block diagram illustrates a computing device 104 collecting data from a plurality of mobile computing devices 102. In some embodiments, the collected data represents crowd-sourced data. The mobile computing devices 102, such as mobile computing device #1 through mobile computing device #N, include devices such as mobile telephones, gaming consoles, and other handheld or vehicle-mounted devices. The mobile computing devices 102 each include, or have access to, one or more sensors 110 that collect device data 108. Exemplary sensors 110 include network interfaces (e.g., wired, wireless, satellite, radio, BLUETOOTH brand interfaces), cameras, microphones, accelerometers, global positioning devices, thermometers, barometers, radio frequency identification (RFID) devices, radar detectors, and automotive vehicle information systems. The device data 108 describes the mobile computing devices 102 or environments thereof, and includes the data collected by the sensors 110 as well as other data such as incoming and outgoing messages, device state data (e.g., idle or active), and user-device interaction history. In some embodiments, the device data 108 describes one or more of the following: location, elevation, heading, speed, acceleration, direction, weather, messages (e.g., electronic mail messages, instant messages, blog messages, microblog messages, and the like), user interaction, image data (e.g., photographs), voice data, text data, and files. As an example, the device data 108 includes social content data.

The mobile computing devices 102 communicate with the computing device 104 via a network 106. Exemplary networks 106 include wired and wireless networks. Exemplary wireless networks include one or more of wireless fidelity (Wi-Fi) networks, BLUETOOTH brand networks, cellular networks, and satellite networks. In some embodiments, the computing device 104 is remote from the mobile computing devices 102. In other embodiments, the computing device 104 is local to the mobile computing devices 102, or one of the mobile computing devices 102.

In some embodiments, the computing device 104 operates to create and distribute temporal maps 208 to the mobile computing devices 102. For example, the computing device 104 operates to collect the device data 108 from the mobile computing devices 102, synthesize the device data 108 to create the temporal maps 208, and distribute the created maps 208, as described below with reference to FIG. 3. In further embodiments, one or more of the mobile computing devices 102 store the temporal maps 208 and/or temporal geospatial patterns 112. The mobile computing devices 102 may also execute synthesis operations 114 to identify the temporal geospatial patterns 112 and/or create the temporal maps 208.

Figure 2:
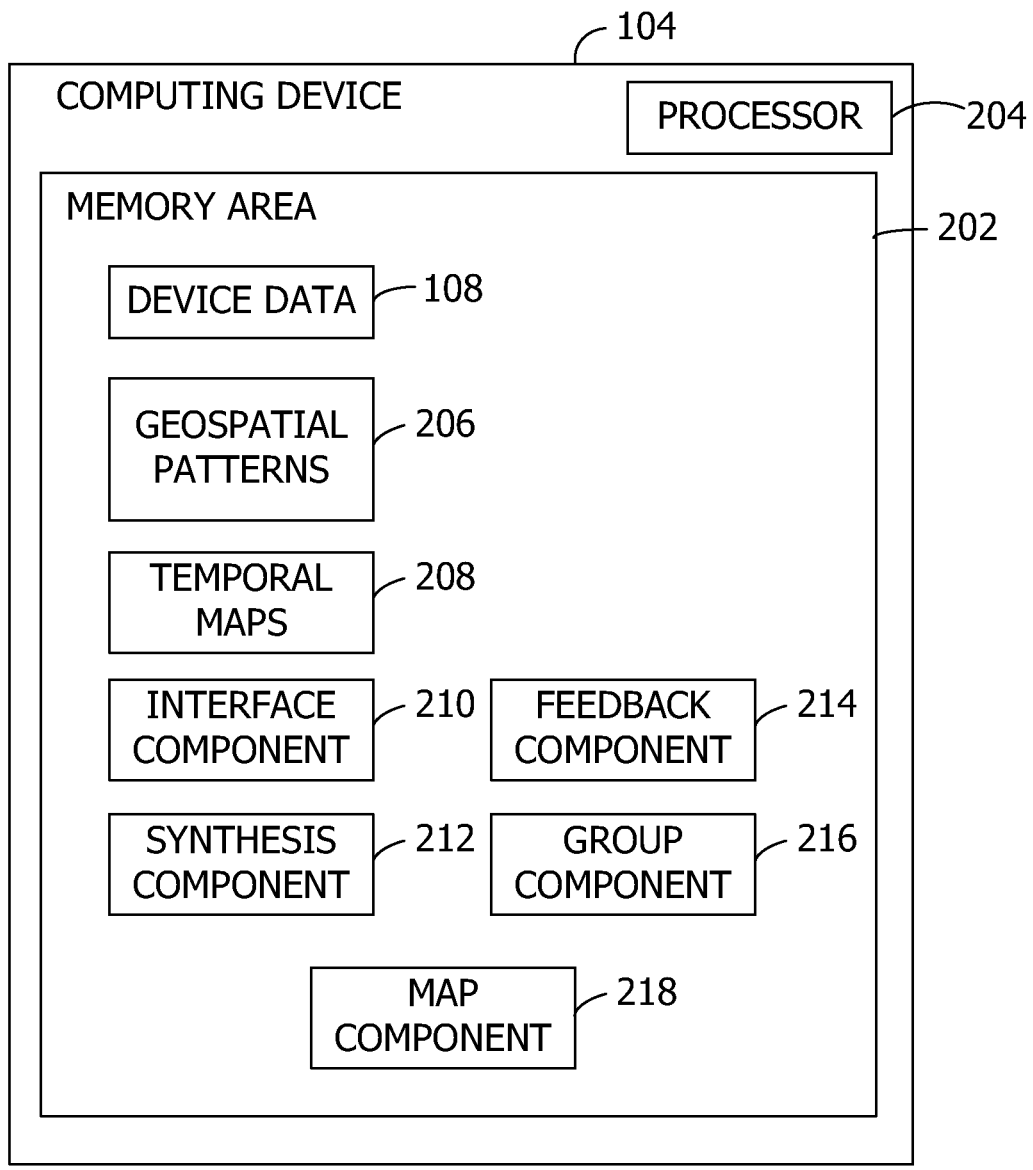
FIG. 2 is an exemplary block diagram illustrating the computing device having a memory area storing the device data, geospatial patterns, and maps.

Referring next to FIG. 2, an exemplary block diagram illustrates the computing device 104 having a memory area 202 storing the device data 108, geospatial patterns 206, and temporal maps 208. The device data 108 is received by the computing device 104 from one or more other computing devices (e.g., the mobile computing devices 102). In some embodiments, the computing device 104 creates the temporal maps 208 based on the geospatial patterns 206. The computing device 104 includes at least the memory area 202 and a processor 204. The device data 108, geospatial patterns 206, and/or temporal maps 208 may be stored locally as in the example of FIG. 2, or stored remotely such as by a web service (e.g., a cloud computing web service).

The memory area 202, or one or more computer-readable media, further stores computer-executable components for implementing aspects of the disclosure. Exemplary components include an interface component 210, a synthesis component 212, a feedback component 214, a group component 216, and a map component 218. These components are described below with reference to FIG. 3.

In general, the memory area 202 is associated with the computing device 104. For example, in FIG. 2, the memory area 202 is within the computing device 104. However, the memory area 202 includes any memory area internal to, external to, or accessible by computing device 104. Further, the memory area 202 or any of the data stored thereon may be associated with any server or other computer, local or remote from the computing device 104 (e.g., accessible via a network).

The processor 204 includes any quantity of processing units, and is programmed to execute computer-executable instructions for implementing aspects of the disclosure. The instructions may be performed by the processor 204 or by multiple processors executing within the computing device 104, or performed by a processor external to the computing device 104 (e.g., by a cloud service). In some embodiments, the processor 204 is programmed to execute instructions such as those illustrated in the figures (e.g., FIG. 3).

Figure 3:
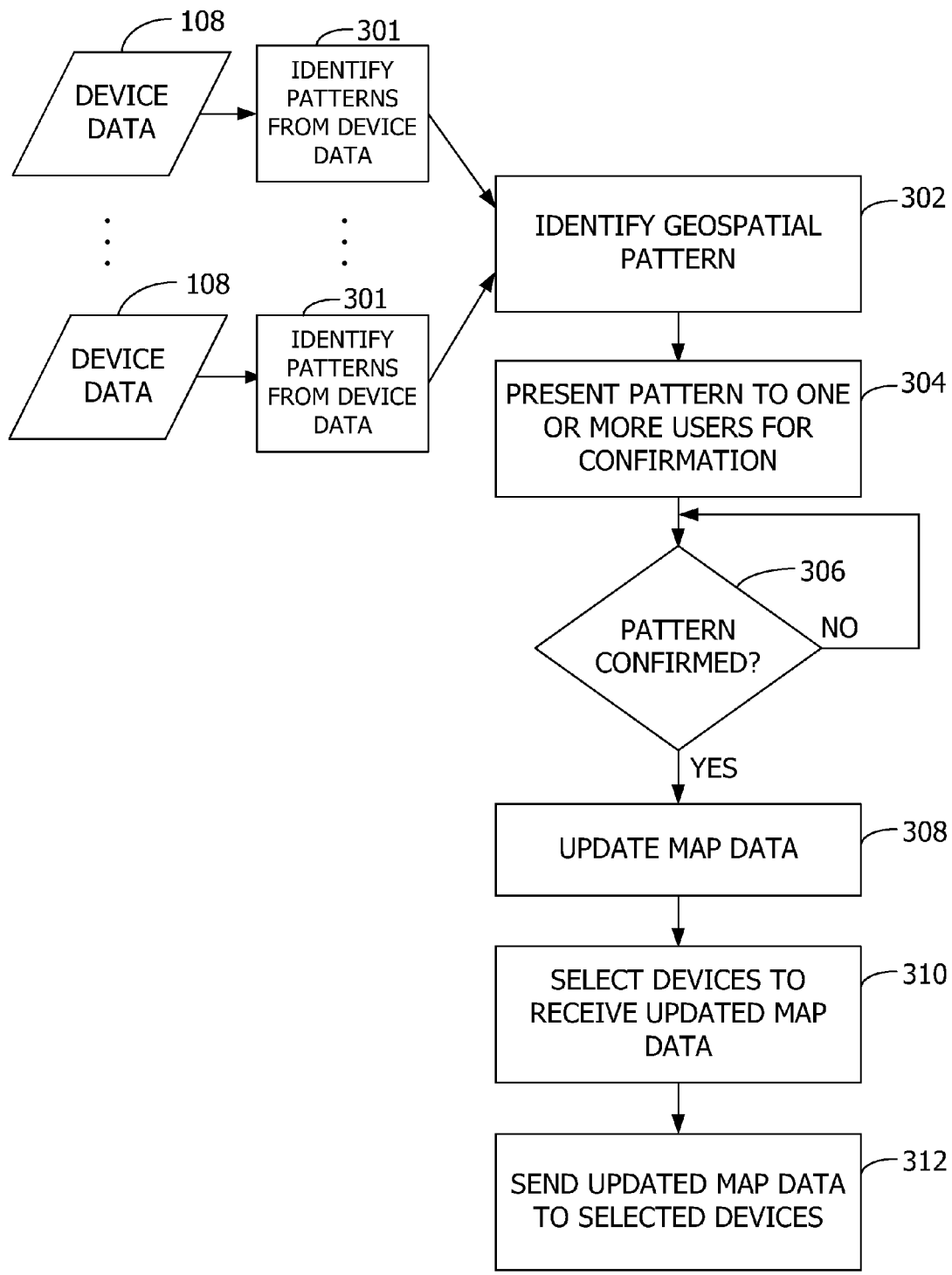
FIG. 3 is an exemplary flow chart illustrating operation of the computing device inferring geospatial patterns and distributing map data based thereon.

Referring next to FIG. 3, an exemplary flow chart illustrates operation of the computing device 104 inferring geospatial patterns 206 and distributing map data based thereon. The computing device 104 accesses the device data 108. In some embodiments, the device data 108 is associated with one of the mobile computing devices 102 (or other computing devices), or associated with a plurality of the mobile computing devices 102 (or other computing devices). In an example, the computing device 104 accesses the device data 108 received during a pre-defined time period (e.g., every hour, night, day, week, etc.).

In some embodiments, on-device synthesis is performed to identify patterns from the device data 108 at 301. Each of the mobile computing devices 102 collects and synthesizes the device data 108, and further finds correlations based on other known data from a plurality of sources (e.g., calendar information, location, etc.). In an example, device data 108 that includes the message "coffee with bridge team" is correlated with a current location to identify a nearby coffee shop. The correlated message becomes "bridge game at coffee shop at 211 main street", which is presented at 304 to other computing devices.

In other embodiments, the on-device synthesis operations at 301 are performed on device data 108 from a plurality of computing devices.

The computing device 104 identifies at least one geospatial pattern 206 at 302 from the device data 108 and correlations (as available) from the on-device synthesis operations at 301. For example, the computing device 104 analyzes the device data 108 for patterns 206 such as navigational patterns, user behavior, and other patterns. Additional examples are provided below.

In some embodiments, the identified patterns 206 are presented to one or more of the users at 304. Aspects of the invention contemplate operations to validate the identified patterns 206 and scope the distribution or presentation of the identified patterns 206 (or data derived therefrom) to the users who are interested in and/or will benefit from the patterns 206. For example, the identified patterns 206 may be presented to the user whose device data 108 contributed to identification of the patterns 206, or the identified patterns 206 may be presented to a group of peer users or other selection of users. The users determine whether the identified patterns 206 are valid. Some embodiments of the disclosure further generate a confidence factor or other indicator of the correctness, accuracy, or reliability of the identified patterns 206. The confidence factor is generated based on one or more criteria and includes, for example, a weight value correspond to: a quantity of the devices contributing the device data 108 or otherwise associated with the identified patterns 206, similarity of the device data 108, a degree of correlation to other data including the user data, and a location of the devices contributing the device data 108. In some embodiments, the confidence factor is provided to the users along with the identified patterns 206. The users confirm or reject the identified patterns 206 based on various factors including, for example, the provided confidence factor and/or the level of relevance or interest of the user in the identified patterns 206. For example, the level of relevance or interest may be determined from one or more of the following: a defined user preference, user behavior history, and a location of the user. Further, acceptance of the identified patterns 206 may be explicit (e.g., the user explicitly accepts or rejects) and/or implicit (e.g., a device of the user accepts or rejects based on, for example, user preferences and/or past behavior).

If the presented pattern 206 is confirmed by the user(s) at 306, map data is created or updated at 308 using at least the identified patterns 206. The map data represents metadata that is used to populate one or more maps 208. The populated maps 208 each illustrate at least one of the geospatial patterns 206. In some embodiments, the map data may be created using the identified patterns 206 along with user data or public event data to provide context for the identified patterns 206. In such instances, the user data is correlated with the identified patterns 206 to provide the context. Exemplary user data includes calendar data, message data, task data, social networking data, location data, and a purchase history of the user. The user data is obtained from the memory area 202 (e.g., local to each computing device 104) or from another memory area remote from the computing device 104. An example includes identifying a pattern in which multiple users traveling along a highway performed u-turns. Aspects of the disclosure may combine the identified pattern with knowledge of the proximity of the users to a stadium and with knowledge of an upcoming event at the stadium to create map data indicating that users heading to the event should take another route.

In some embodiments, the map data is not created or updated if the presented pattern 206 is not confirmed. Instead, the presented pattern 206 may be discarded, or otherwise identified as suspect.

Aspects of the disclosure may further store the map data and/or maps 208 in a library, repository, or other structure for archival purposes. In such embodiments, the library represents a collection of temporal maps 208 that may be searched, compared, or otherwise analyzed to identify relationships or trends among the geospatial patterns 206. In an example in which the patterns 206 include navigation paths, the library is analyzed to identify trends such as an increase in traffic incidents during particular times of the year (e.g., back to school, special events, etc.).

One or more of computing devices are selected at 310 to receive the map data. For example, the selected computing devices include a group of computing devices that are peers to at least one of the computing devices that contributed the device data 108 from which the patterns 206 were identified. In an example in which the map data indicates a hazard at a location, the selected computing devices include devices near the location. In the example above in which aspects of the disclosure determine that users heading to an event at a stadium will encounter a traffic incident, aspects of the disclosure further identify users that may be heading to the game. Those users may have, for example, been pre-registered for the game or be on a list of ticket purchasers for the game. The devices selected at 310 then include the devices of those identified users.

In another embodiment, the devices selected at 310 based on a previous selection of devices. For example, aspects of the disclosure determine whether any of the identified patterns 206 are related to a previously identified pattern 206. Similarly, the map data or maps 208 are compared to previously created map data or maps 208. The devices selected at 310 then correspond to the devices selected to receive the previously identified pattern 206, map data, or maps 208. As an example, if a map of a traffic incident was previously delivered to a set of devices and a newly created map is determined to relate to the previous map, the newly created map is sent to the same set of devices. In this manner, users who were previously notified of a traffic incident may be notified of the clearing of the traffic incident.

At 312, the updated map data is transmitted or otherwise sent to the devices selected at 310. In some embodiments, upon receipt of the map data, the selected devices each determine whether to incorporate the updated map data into a map for presentation to the user of the selected device. For example, each of the selected devices may compare the map data with a current location and/or direction of the device to determine whether the map data is relevant to the user of the device. If the map data is relevant, the device incorporates the map data into the map. In other embodiments, the selected devices automatically incorporate the updated map data without additional screening, filtering, or other analysis.

Alternatively or in addition, one or more of the populated maps 208 with the updated map data are sent at 310 to the selected devices. In such embodiments, each of the selected devices may compare the map 208 with a current location and/or direction of the device to determine whether the map 208 is relevant to the user of the device. If the map 208 is relevant, the device presents the map 208 to the user of the device.

In addition to sending the map data and/or the maps 208, recommendations may be sent to the user. In an example in which the map 208 illustrates a traffic incident, the recommendations include alternative routes. Some embodiments contemplate subscription functionality enabling the user to subscribe to receive recommendations. In such embodiments, users that do not subscribe do not receive the recommendations. Exemplary recommendations include "80% of people who turned right on Main Street eventually turned around and back-tracked to Elm Street," and "50% of people reported an event in progress up ahead and social network messages indicate a bike race on Mumble Street Bridge right now." In the latter example, the recommendation enables the users to confirm or alter their navigation path.

In some embodiments, one or more computer-executable components, such as the components illustrated in FIG. 2, execute on the computing device 104 to perform the operations illustrated in FIG. 3. The interface component 210, when executed by the processor 204, causes the processor 204 to receive the device data 108 from one or more of computing devices. The synthesis component 212, when executed by the processor 204, causes the processor 204 to identify at least one geospatial pattern 206 from the device data 108 received by the interface component 210. The feedback component 214, when executed by the processor 204, causes the processor 204 to present the geospatial pattern 206 identified by the synthesis component 212 to at least one user of the computing devices. The feedback component 214 identifies the user, for example, based on a location of the user (e.g., relative to the temporal geospatial pattern). The user confirms, edits, or rejects the geospatial pattern 206 and informs the interface component 210. Edits to the pattern 206 include corrections, additions, or deletions. In some embodiments, the user provides semantic information to add meaning to the geospatial pattern 206. The edits, comments, acceptances, or other feedback provided by the user and subsequent users cumulatively improves the accuracy of the pattern 206. The group component 216, when executed by the processor 204, causes the processor 204 to propagate, based on the response received by the interface component 210, the geospatial pattern 206 identified by the synthesis component 212 to one or more of the computing devices.

In some embodiments, the map component 218, when executed by the processor 204, causes the processor 204 to generate a temporal map 208 based on the geospatial pattern 206 identified by the synthesis component 212. For example, if the received device data 108 comprises a photograph and the identified geospatial pattern 206 represents a traffic hazard, the generated temporal map 208 includes the photograph and a caption identifying the traffic hazard. In further embodiments, the feedback component 214 may present the temporal map 208 to the user for confirmation, editing, or rejection. In such embodiments, the temporal map 208 represents an "open" map available for editing by the users selected by the feedback component 214. Further, each of the users may limit the distribution of the edits (e.g., update the user's map only, update maps in my social network, or update additional maps). Similarly, aspects of the disclosure may constrain how socially far an edit travels. For example, when two users make an update available in a group, the update can be made available to the members of the group. In another example, when a threshold quantity of users of a population makes or accepts an edit to the map 208, the edit is applied to the entire population. In still another example, the edit may be forwarded to a commercial data feed (e.g., to correct an address).

In some embodiments, the device data 108 is collected from a first plurality of computing devices, and the updated map data is sent to a second plurality of computing devices. For example, the first plurality of computing devices and the second plurality of computing devices are peers. Some of the computing devices may be included within both the first plurality and the second plurality. In other embodiments, the first plurality and the second plurality include the same devices, such as illustrated and next described with reference to FIG. 4.

In other embodiments, the operations illustrated in FIG. 3 are performed by a web service.

In the example of FIG. 1, the mobile computing devices 102 operate to collect the device data 108 while the computing device 104 identifies the geospatial patterns 206 from the device data 108 aggregated from the mobile computing devices 102. In other embodiments such as illustrated in FIG. 4, each of a plurality of peer devices collects the device data 108 and identifies the patterns 206 from the collected device data 108.

Figure 4:
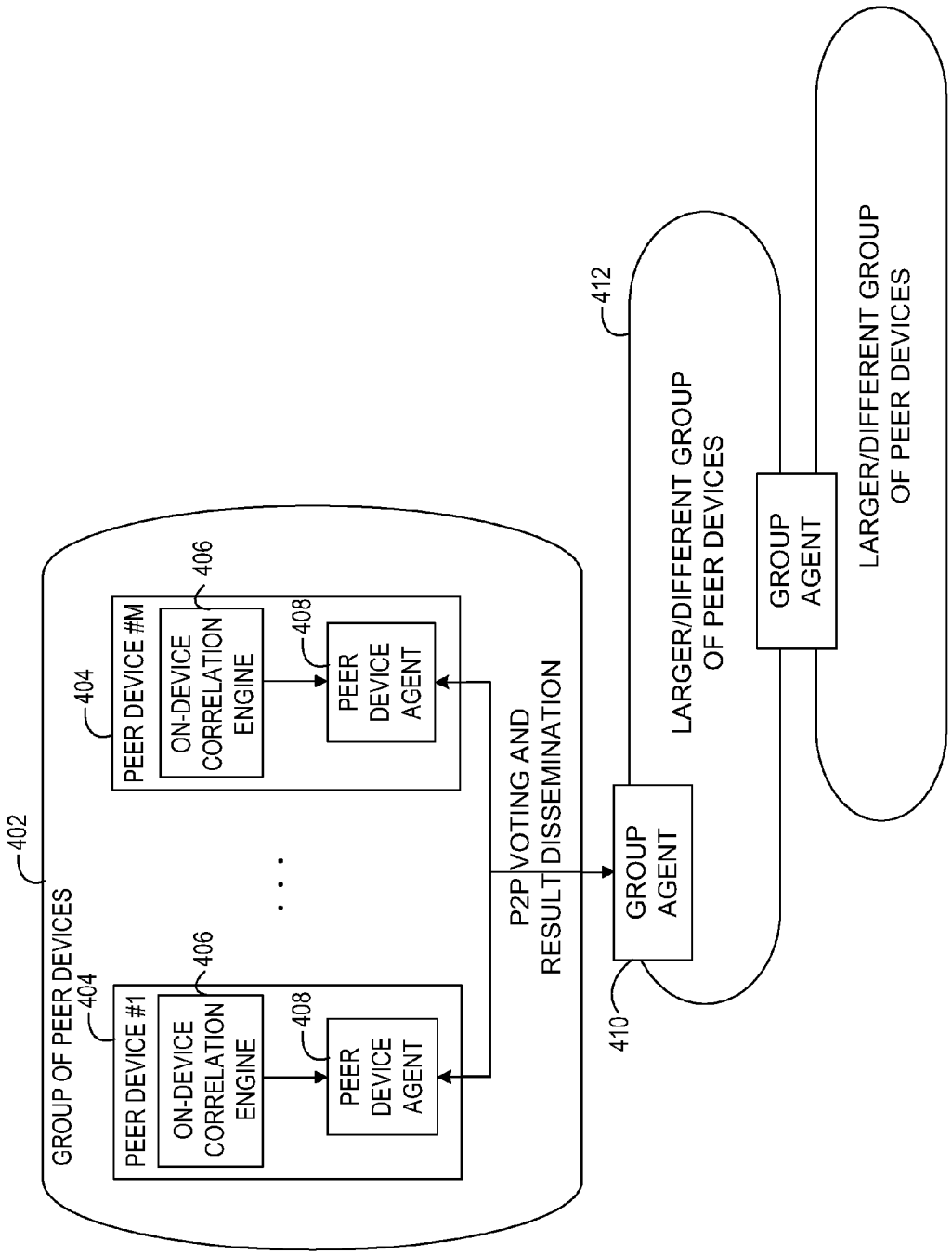
FIG. 4 is an exemplary block diagram illustrating a group of peer devices correlating device data and disseminating geospatial patterns within the group.

Referring next to FIG. 4, an exemplary block diagram illustrates a group 402 of peer devices 404 correlating device data 108 and disseminating geospatial patterns 206 within the group 402. The peer devices 404 include, for example, peer device #1 through peer device #M. The group 402 of peer devices 404 includes any quantity of peer devices 404, and the quantity may differ per group. In some embodiments, the peer devices 404 are considered peers because of some commonality among the peer devices 404. For example, the peer devices 404 may be associated with a particular user or organization, be within a particular geographic location, have expressed a particular interest, or the like. The group 402 of peer devices 404 may also represent a social group. Exemplary social groups are defined by social graphs (e.g., degrees of separation), those who participate in an event, those who frequent the same restaurant, those who like the same book, or other shared interest or experience.

The peer devices 404 in FIG. 4 each have an on-device correlation engine 406. Each on-device correlation engine 406 operates to identify the geospatial patterns 206 based on the device data 108 of the peer device 404 on which the on-device correlation engine 406 operates. Exemplary functionality of the on-device correlation engine 406 is described in FIG. 3. A peer device agent 408 on each of the peer devices 404 obtains the geospatial patterns 206 from the on-device correlation engine 406 and communicates the geospatial patterns 206 to a group agent 410. The group agent 410 coordinates peer-to-peer voting on the temporal geospatial patterns 206 among the peer devices 404 and disseminates the results. For example, the group agent 410 selects the geospatial patterns 206 that have been confirmed by a threshold quantity of the peer devices 404 (e.g., a majority). The group agent 410 distributes the selected geospatial patterns 206 to the peer devices 404.

The group agent 410 further acts as a liaison between the group 402 of peer devices 404 and a larger or otherwise different group 412 of peer devices. In the example of FIG. 4, the group agent 410 provides the selected geospatial patterns 206 from the group 402 of peer devices to the larger/different group 412 of peer devices. Peer-to-peer voting and result dissemination occurs in the larger/different group 412 of peer devices similar to such activities in the group 402 of peer devices.

Alternatively or in addition, the group agent 410 distributes temporal map data, temporal maps 208, or any other data generated from the geospatial patterns 206.

Further Examples

Various implementations of the disclosure are contemplated. In some embodiments, by correlating the user data with the geospatial patterns 206, colloquial names may be identified. For example, if the geospatial pattern 206 indicates that a particular bridge is closed based on u-turns obtained from the device data 108 and the user data includes directions listing a colloquial name for the bridge, aspects of the disclosure associate the colloquial name with the bridge. Such embodiments create a "geo-thesaurus" of geographic landmarks or other locations.

In another example, people visiting a building provide their device data 108 to a system embodying aspects of the disclosure. The system infers (e.g., in combination with a calendar data feed from the users) a pattern of people parking and then entering through a point in space deemed to be a door based on correlated map information about the building. The system infers that the pattern corresponds to a parking lot for the building with a certain degree of reliability, but there are people not going to the building who park in the lot and people parking in the lot who do not go to the building). In such embodiments, the system may ask one or more of the users for express user feedback such as "Is this where you park and enter the building?" The system asks the users by expressly sending the question with thumbs up/thumbs down icons or some other indicia soliciting a response. The confidence factor for the pattern may accompany the question. In some embodiments, if the pattern is incorrect or incomplete, the user is asked to provide the correct or missing information.

As another example, if the user travels to Building X for a meeting with Team Y yet ends up traveling to Building Z, aspects of the disclosure may determine that Team Y has moved to Building Z.

In a navigational example, if a threshold quantity of people are detecting as going to a bridge and turning around, aspects of the disclosure attempt to infer a reason for the pattern (e.g., the bridge is down, an event is underway, etc.). By asking for feedback from the user, the common reason for users turning around may be inferred.

In an example in which the user captures a photograph of a building at a location (e.g., the device data 108 includes the photograph), aspects of the disclosure update a map of the location with the photograph. As such, the photograph appears whenever the user displays maps of the location.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks 310 or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for creating the temporal map 208 based on geospatial pattern 206, and exemplary means for identifying the geospatial pattern 206.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for creating temporal maps based on geospatial patterns, said system comprising:
    a memory area for storing device data received from one or more of a plurality of mobile computing devices, said device data describing said one or more of the plurality of mobile computing devices or environments thereof; and
    a processor programmed to:
        infer at least one temporal geospatial pattern from the received device data;
        generate a temporal map based at least on the inferred temporal geospatial pattern;
        compare the temporal map to a previously generated temporal map sent to the one or more of the plurality of mobile computing devices;
        select, based on the comparison, at least one of the one or more of the plurality of mobile computing devices that were sent the previously generated temporal map; and
        provide the generated temporal map to the selected at least one of the one or more of the plurality of mobile computing devices.

2. The system of claim 1, wherein the processor is further programmed to generate a confidence factor associated with the inferred temporal geospatial pattern, the confidence factor being accompanied by a question for providing missing information or correcting the inferred temporal geospatial pattern.

3. The system of claim 2, wherein the confidence factor includes a weight value based on one or more of the following: a quantity of the mobile computing devices associated with the inferred temporal geospatial pattern, the received device data, and a location of the one or more of the plurality of mobile computing devices.

4. The system of claim 1, wherein the device data describes one or more of the following: location, elevation, heading, speed, acceleration, direction, weather, messages, user interaction, image data, voice data, text data, and files.

5. The system of claim 1, wherein the temporal geospatial pattern includes one or more of the following: a navigation path, a point of interest, one or more time periods, a weight value, a dwell time at a location, and a social event.

6. The system of claim 1, wherein a level of relevance associated with the inferred temporal geospatial pattern is determined from one or more of the following: a defined user preference, user behavior history, and a location of a user.

7. The system of claim 1, wherein the processor is further programmed to provide a context of the inferred temporal geospatial pattern based on public event data or user data of a user associated with one of the plurality of mobile computing devices.

8. A method comprising:
    accessing, by a processor, device data received from a first plurality of computing devices;
    identifying at least one geospatial pattern from the accessed device data;
    defining map data using the identified at least one geospatial pattern;
    determining whether the identified at least one geospatial pattern is related to a previously identified pattern;
    selecting a second plurality of computing devices for receiving the defined map data based on the determination, the second plurality of computing devices corresponding to a third plurality of computing devices previously selected to receive the previously identified pattern.

9. The method of claim 8, wherein accessing the device data comprises accessing device data received within a pre-defined time period.

10. The method of claim 8, further comprising:
    identifying users associated with the first plurality of computing devices; and
    obtaining user data associated with the identified users, wherein identifying the at least one geospatial pattern comprises correlating the accessed device data with the obtained user data.

11. The method of claim 10, wherein obtaining the user data comprises obtaining one or more of the following: calendar data, message data, task data, social networking data, location data, and a purchase history.

12. The method of claim 8, wherein the defined map data indicates a hazard at a location, and further comprising selecting the second plurality of computing devices based on the location.

13. The method of claim 8, further comprising:
identifying another geospatial pattern relating to said at least one geospatial pattern; and
notifying the first plurality of computing devices of the identified another geospatial pattern.

14. The method of claim 8, wherein defining the map data comprises defining recommendations based on the identified at least one geospatial pattern.

15. One or more computer storage media storing computer-executable components, said components comprising:
an interface component that when executed by at least one processor causes the at least one processor to receive device data from one or more of a plurality of computing devices, said device data describing said one or more of the plurality of computing devices or environments thereof;
a synthesis component that when executed by at least one processor causes the at least one processor to identify at least one geospatial pattern from the device data received by the interface component; and
a group component that when executed by at least one processor causes the at least one processor to propagate the at least one geospatial pattern identified by the synthesis component to a first one of the one or more of the plurality of computing devices that is related to a second one of the one or more of the plurality of computing devices which contributed the device data for identification of the at least one geospatial pattern.

16. The computer storage media of claim 15, further comprising a map component that when executed by at least one processor causes the at least one processor to generate a map based on the at least one geospatial pattern identified by the synthesis component.

17. The computer storage media of claim 15, further comprising a feedback component that when executed by at least one processor causes the at least one processor to identify at least one user for editing, confirming or rejecting the at least one geospatial pattern.

18. The computer storage media of claim 15, wherein the at least one geospatial pattern is selected for propagation based on responses received from a threshold quantity of the one or more of the plurality of computing devices.

19. The computer storage media of claim 15, wherein a reason for the identified at least one geospatial pattern is inferred based on the device data received from a threshold quantity of the one or more of the plurality of computing devices.

20. The method of claim 8, wherein determining whether the identified at least one geospatial pattern is related to a previously identified pattern comprises determining whether the at least one geospatial pattern is associated with a same topic of interest as the previously identified pattern.

* * * * *